United States Patent
Wei et al.

(10) Patent No.: US 11,057,777 B2
(45) Date of Patent: Jul. 6, 2021

(54) DISTANCE BASED SESSION ROAMING

(71) Applicant: Citrix Systems, Inc., Fort Lauderdale, FL (US)

(72) Inventors: Daowen Wei, Nanjing (CN); Jian Ding, Nanjing (CN); Hengbo Wang, Nanjing (CN)

(73) Assignee: Citrix Systems, Inc., Fort Lauderdale, FL (US)

(*) Notice: Subject to any disclaimer, the term of this patent is extended or adjusted under 35 U.S.C. 154(b) by 0 days.

(21) Appl. No.: 16/566,954

(22) Filed: Sep. 11, 2019

(65) Prior Publication Data
US 2020/0413251 A1    Dec. 31, 2020

Related U.S. Application Data

(63) Continuation of application No. PCT/CN2019/093686, filed on Jun. 28, 2019.

(51) Int. Cl.
| H04L 29/06 | (2006.01) |
| H04W 12/63 | (2021.01) |
| H04W 12/06 | (2021.01) |
| H04W 12/37 | (2021.01) |
| H04W 12/68 | (2021.01) |

(Continued)

(52) U.S. Cl.
CPC ......... *H04W 12/63* (2021.01); *H04L 63/0492* (2013.01); *H04L 67/148* (2013.01); *H04W 12/06* (2013.01); *H04W 12/37* (2021.01); *H04W 12/68* (2021.01); *H04W 12/76* (2021.01)

(58) Field of Classification Search
CPC .. H04L 63/0492; H04L 67/148; H04W 12/06; H04W 12/37; H04W 12/63; H04W 12/68; H04W 12/76
See application file for complete search history.

(56) References Cited

U.S. PATENT DOCUMENTS

| 8,800,007 B1 * | 8/2014 | Rajagopalan ........... H04L 9/083 726/5 |
| 10,841,756 B1 * | 11/2020 | Sathyanarayana Rao ................... H04L 61/1594 |

(Continued)

FOREIGN PATENT DOCUMENTS

| CN | 107659726 A | 2/2018 |
| CN | 107690770 A | 2/2018 |

OTHER PUBLICATIONS

Mar. 26, 2020 (WO) International Search Report and Written Opinion—App. PCT/CN/093686.

*Primary Examiner* — Thaddeus J Plecha
(74) *Attorney, Agent, or Firm* — Banner & Witcoff, Ltd.

(57) ABSTRACT

Typically, when a user switches sessions between devices, the user authenticates the sessions by providing user account information, password, and/or pin code input or other credentials. However, when the user is frequently switching sessions between devices, authenticating sessions may result in the user reducing or even stopping switching across mobile devices. Systems and methods according to this disclosure provide automatic session roaming across mobile devices using proximity authentication. Upon detecting an indication to initiate session roaming, the source device automatically roams the session on the source device to a target device based on a proximity of the source device to the target device. The session is handed off from the source device to the target device as an authenticated user session.

20 Claims, 10 Drawing Sheets

(51) Int. Cl.
*H04W 12/76* (2021.01)
*H04L 29/08* (2006.01)

(56) References Cited

U.S. PATENT DOCUMENTS

| | | | |
|---|---|---|---|
| 2007/0094490 A1* | 4/2007 | Lohr | H04L 67/14 |
| | | | 713/153 |
| 2007/0291694 A1 | 12/2007 | Zhang | |
| 2013/0041954 A1* | 2/2013 | Kim | H04L 65/1069 |
| | | | 709/204 |
| 2015/0113048 A1* | 4/2015 | Limburn | H04L 67/148 |
| | | | 709/203 |
| 2016/0125490 A1* | 5/2016 | Angal | G06Q 30/06 |
| | | | 705/26.35 |
| 2018/0077620 A1* | 3/2018 | Hassan | H04W 76/11 |
| 2020/0007530 A1* | 1/2020 | Mohamad Abdul | H04L 67/26 |

* cited by examiner

DISTANCE BASED SESSION ROAMING

CROSS REFERENCE TO RELATED APPLICATION

This application claims priority to and is a continuation of PCT International Application No. PCT/CN2019/093686, filed Jun. 28, 2019, hereby incorporated by reference it its entirety.

FIELD

Aspects described herein generally relate to computer networking, remote computer access, virtualization, enterprise mobility management, and hardware and software related thereto. More specifically, one or more aspects described herein provide systems and methods for automatic remote session roaming across devices based on proximity authentication.

BACKGROUND

Users expect to remotely access their mobile workspaces at any time across a variety of mobile devices that may have different hardware, and/or mobile platforms regardless of location or network. Due to this, users also expect a unified and seamless user experience on virtual desktops and applications across mobile devices.

SUMMARY

The following presents a simplified summary of various aspects described herein. This summary is not an extensive overview, and is not intended to identify required or critical elements or to delineate the scope of the claims. The following summary merely presents some concepts in a simplified form as an introductory prelude to the more detailed description provided below.

According to one aspect, the disclosure relates to a computer-implemented method that includes based on receiving an indication to initiate roaming of a session of a mobile workspace of a user that is launched on a first user device, selecting a second user device from among one or more trusted user devices based on a proximity of the second user device to the first user device. The method may include launching the session as a user authenticated session on the second user device. The indication to initiate session roaming may be based on at least one of a user gesture, or a policy rule. The policy rule may specify a battery usage threshold, and the indication to initiate roaming of the session may be based on a determination that a battery usage of the first user device is below the specified battery usage threshold. The policy rule may identify the first user device as a master device, one or more user devices may be designated as a slave device of the first user device and the indication to initiate session roaming is may be based on a determination that a distance between the first user device and at least one slave device is less than a predetermined threshold. The policy rule may identify a user device other than the first user device as a master device, and the indication to initiate session roaming may be based on a determination that the first user device is designated as a slave device of the master device, and a distance between the first user device and the master device is greater than a predetermined threshold. The first user device and the second user device may each be connected to a different one of a wide area network, and a local area network. Roaming the session from the first user device to a second user device may include disconnecting the session launched on the first user device. The first user device and the one or more trusted user devices may belong to a logical grouping of user devices. The second user device may be selected based on a proximity to the first user device. The first user device and the second user devices may each have at least one of different screen sizes, or hardware. The first user device and the second user device may be of different device types.

According to one aspect, the disclosure relates to a system that includes one or more processors. The system also includes a memory storing computer-readable instructions that, when executed by the one or more processors, configure the one or more processors to based on receiving, an indication to initiate roaming of a session of a mobile workspace of a user that is launched on a first user device, select a second user device from among one or more trusted user devices based on a proximity of the second user device to the first user device. The instructions further configure the one or more processors to roam the session from the first device to the selected second user device by launching the session as a user authenticated session of the mobile workspace of the user on the second user device. The indication to initiate session roaming may be based on a user gesture or policy rule. The policy rule may set a battery usage threshold, and the indication to initiate session roaming may be based on a determination that a battery usage of the first user device is below the battery usage threshold. The policy rule may identify the first user device as a master device, and the indication to initiate session roaming may be based on a determination that a distance between the first user device and at least one user device designated as a slave device of the master device is less than a predetermined threshold. The policy rule may identify a user device other than the first user device as a master device, and the indication to initiate session roaming may be based on a determination that the first user device is designated as a slave device of the master device, and a distance between the first user device and the master device is greater than a predetermined threshold. The first user device and the second user device may each be connected to a different one of a wide area network, and a local area network. Roaming the session from the first user device to a second user device may include disconnecting the session launched on the first user device. The first user device and the one or more trusted user devices may belong to a logical grouping of user devices. The second user device may be selected based on a proximity to the first user device. The first user device and the second user devices may each have different screen sizes. The first user device and the second user device may be of different device types.

According to another aspect, the disclosure relates to transitory machine readable storage medium comprising machine-readable instructions for causing a processor to execute a method. The method includes based on receiving, by a computing device, an indication to initiate roaming of a session of a mobile workspace of a user that is launched on a first user device, selecting a second user device from among one or more trusted user devices based on a proximity of the second user device to the first user device. The method includes roaming the session from the first device to the selected second user device by launching the session as a user authenticated session of the mobile workspace of the user on the second user device.

These and additional aspects will be appreciated with the benefit of the disclosures discussed in further detail below.

BRIEF DESCRIPTION OF THE DRAWINGS

A more complete understanding of aspects described herein and the advantages thereof may be acquired by referring to the following description in consideration of the accompanying drawings, in which like reference numbers indicate like features, and wherein.

DETAILED DESCRIPTION

In the following description of the various embodiments, reference is made to the accompanying drawings identified above and which form a part hereof, and in which is shown by way of illustration various embodiments in which aspects described herein may be practiced. It is to be understood that other embodiments may be utilized and structural and functional modifications may be made without departing from the scope described herein. Various aspects are capable of other embodiments and of being practiced or being carried out in various different ways.

As a general introduction to the subject matter described in more detail below, aspects described herein are directed towards automatic session roaming across mobile devices belonging to a logical grouping of devices using proximity based authentication. As a result, a user may advantageously switch a session of a mobile workspace across mobile devices based on a user gesture or policy rule without additional user logon, explicit user account, pin code input or other credentials thereby, decreasing the risk of password leak or theft, especially in a public or otherwise unsecure environment.

It is to be understood that the phraseology and terminology used herein are for the purpose of description and should not be regarded as limiting. Rather, the phrases and terms used herein are to be given their broadest interpretation and meaning. The use of "including" and "comprising" and variations thereof is meant to encompass the items listed thereafter and equivalents thereof as well as additional items and equivalents thereof. The use of the terms "connected" and "coupled" and similar terms, is meant to include both direct and indirect connecting and coupling, and the like.

Computing Architecture

Figure 1:
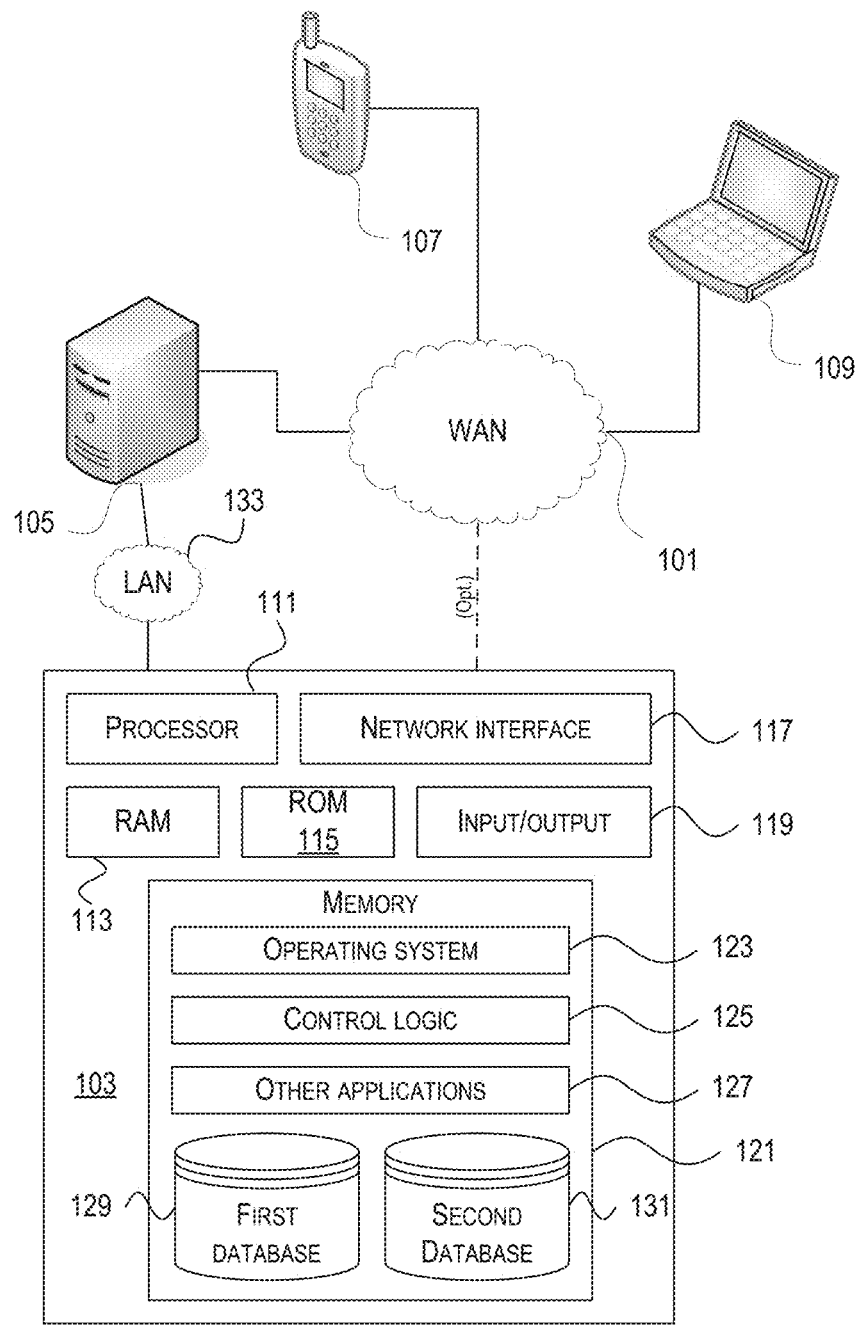
FIG. 1 depicts an illustrative computer system architecture that may be used in accordance with one or more illustrative aspects described herein.

Computer software, hardware, and networks may be utilized in a variety of different system environments, including standalone, networked, remote-access (also known as remote desktop), virtualized, and/or cloud-based environments, among others. FIG. 1 illustrates one example of a system architecture and data processing device that may be used to implement one or more illustrative aspects described herein in a standalone and/or networked environment. Various network nodes 103, 105, 107, and 109 may be interconnected via a wide area network (WAN) 101, such as the Internet. Other networks may also or alternatively be used, including private intranets, corporate networks, local area networks (LAN), metropolitan area networks (MAN), wireless networks, personal networks (PAN), and the like. Network 101 is for illustration purposes and may be replaced with fewer or additional computer networks. A local area network 133 may have one or more of any known LAN topology and may use one or more of a variety of different protocols, such as Ethernet. Devices 103, 105, 107, and 109 and other devices (not shown) may be connected to one or more of the networks via twisted pair wires, coaxial cable, fiber optics, radio waves, or other communication media.

The term "network" as used herein and depicted in the drawings refers not only to systems in which remote storage devices are coupled together via one or more communication paths, but also to stand-alone devices that may be coupled, from time to time, to such systems that have storage capability. Consequently, the term "network" includes not only a "physical network" but also a "content network," which is comprised of the data—attributable to a single entity—which resides across all physical networks.

The components may include data server 103, web server 105, and client computers 107, 109. Data server 103 provides overall access, control and administration of databases and control software for performing one or more illustrative aspects describe herein. Data server 103 may be connected to web server 105 through which users interact with and obtain data as requested. Alternatively, data server 103 may act as a web server itself and be directly connected to the Internet. Data server 103 may be connected to web server 105 through the local area network 133, the wide area network 101 (e.g., the Internet), via direct or indirect connection, or via some other network. Users may interact with the data server 103 using remote computers 107, 109, e.g., using a web browser to connect to the data server 103 via one or more externally exposed web sites hosted by web server 105. Client computers 107, 109 may be used in concert with data server 103 to access data stored therein, or may be used for other purposes. For example, from client device 107 a user may access web server 105 using an Internet browser, as is known in the art, or by executing a software application that communicates with web server 105 and/or data server 103 over a computer network (such as the Internet).

Servers and applications may be combined on the same physical machines, and retain separate virtual or logical addresses, or may reside on separate physical machines. FIG. 1 illustrates just one example of a network architecture that may be used, and those of skill in the art will appreciate that the specific network architecture and data processing devices used may vary, and are secondary to the functionality that they provide, as further described herein. For example, services provided by web server 105 and data server 103 may be combined on a single server.

Each component 103, 105, 107, 109 may be any type of known computer, server, or data processing device. Data server 103, e.g., may include a processor 111 controlling overall operation of the data server 103. Data server 103 may further include random access memory (RAM) 113, read only memory (ROM) 115, network interface 117, input/output interfaces 119 (e.g., keyboard, mouse, display, printer, etc.), and memory 121. Input/output (I/O) 119 may include a variety of interface units and drives for reading, writing, displaying, and/or printing data or files. Memory 121 may further store operating system software 123 for controlling overall operation of the data processing device 103, control logic 125 for instructing data server 103 to perform aspects described herein, and other application software 127 providing secondary, support, and/or other functionality which may or might not be used in conjunction with aspects described herein. The control logic 125 may also be referred to herein as the data server software 125. Functionality of the data server software 125 may refer to operations or decisions made automatically based on rules coded into the control logic 125, made manually by a user providing input into the system, and/or a combination of automatic processing based on user input (e.g., queries, data updates, etc.).

Memory 121 may also store data used in performance of one or more aspects described herein, including a first database 129 and a second database 131. In some embodiments, the first database 129 may include the second database 131 (e.g., as a separate table, report, etc.). That is, the information can be stored in a single database, or separated into different logical, virtual, or physical databases, depending on system design. Devices 105, 107, and 109 may have similar or different architecture as described with respect to device 103. Those of skill in the art will appreciate that the functionality of data processing device 103 (or device 105, 107, or 109) as described herein may be spread across multiple data processing devices, for example, to distribute processing load across multiple computers, to segregate transactions based on geographic location, user access level, quality of service (QoS), etc.

One or more aspects may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HyperText Markup Language (HTML) or Extensible Markup Language (XML). The computer executable instructions may be stored on a computer readable medium such as a nonvolatile storage device. Any suitable computer readable storage media may be utilized, including hard disks, CD-ROMs, optical storage devices, magnetic storage devices, solid state storage devices, and/or any combination thereof. In addition, various transmission (non-storage) media representing data or events as described herein may be transferred between a source and a destination in the form of electromagnetic waves traveling through signal-conducting media such as metal wires, optical fibers, and/or wireless transmission media (e.g., air and/or space). Various aspects described herein may be embodied as a method, a data processing system, or a computer program product. Therefore, various functionalities may be embodied in whole or in part in software, firmware, and/or hardware or hardware equivalents such as integrated circuits, field programmable gate arrays (FPGA), and the like. Particular data structures may be used to more effectively implement one or more aspects described herein, and such data structures are contemplated within the scope of computer executable instructions and computer-usable data described herein.

Figure 2:
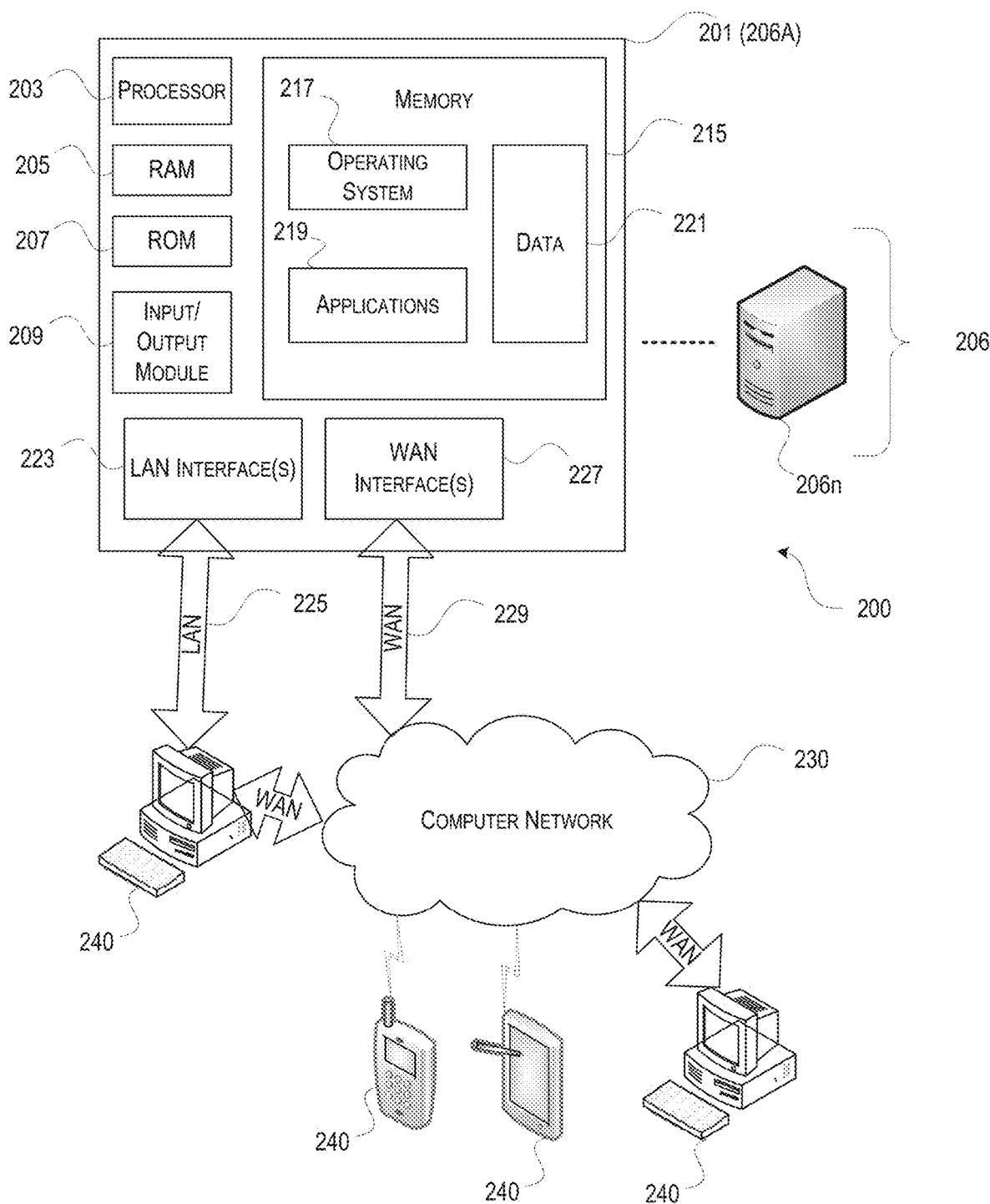
FIG. 2 depicts an illustrative remote-access system architecture that may be used in accordance with one or more illustrative aspects described herein.

With further reference to FIG. 2, one or more aspects described herein may be implemented in a remote-access environment. FIG. 2 depicts an example system architecture including a computing device 201 in an illustrative computing environment 200 that may be used according to one or more illustrative aspects described herein. Computing device 201 may be used as a server 206a in a single-server or multi-server desktop virtualization system (e.g., a remote access or cloud system) and can be configured to provide virtual machines for client access devices. The computing device 201 may have a processor 203 for controlling overall operation of the device 201 and its associated components, including RAM 205, ROM 207, Input/Output (I/O) module 209, and memory 215.

I/O module 209 may include a mouse, keypad, touch screen, scanner, optical reader, and/or stylus (or other input device(s)) through which a user of computing device 201 may provide input, and may also include one or more of a speaker for providing audio output and one or more of a video display device for providing textual, audiovisual, and/or graphical output. Software may be stored within memory 215 and/or other storage to provide instructions to processor 203 for configuring computing device 201 into a special purpose computing device in order to perform various functions as described herein. For example, memory 215 may store software used by the computing device 201, such as an operating system 217, application programs 219, and an associated database 221.

Computing device 201 may operate in a networked environment supporting connections to one or more remote computers, such as terminals 240 (also referred to as client devices and/or client machines). The terminals 240 may be personal computers, mobile devices, laptop computers, tablets, or servers that include many or all of the elements described above with respect to the computing device 103 or 201. The network connections depicted in FIG. 2 include a local area network (LAN) 225 and a wide area network (WAN) 229, but may also include other networks. When used in a LAN networking environment, computing device 201 may be connected to the LAN 225 through a network interface or adapter 223. When used in a WAN networking environment, computing device 201 may include a modem or other wide area network interface 227 for establishing communications over the WAN 229, such as computer network 230 (e.g., the Internet). It will be appreciated that the network connections shown are illustrative and other means of establishing a communications link between the computers may be used. Computing device 201 and/or terminals 240 may also be mobile terminals (e.g., mobile phones, smartphones, personal digital assistants (PDAs), notebooks, etc.) including various other components, such as a battery, speaker, and antennas (not shown).

Aspects described herein may also be operational with numerous other general purpose or special purpose computing system environments or configurations. Examples of other computing systems, environments, and/or configurations that may be suitable for use with aspects described herein include, but are not limited to, personal computers, server computers, hand-held or laptop devices, multiprocessor systems, microprocessor-based systems, set top boxes, programmable consumer electronics, network personal computers (PCs), minicomputers, mainframe computers, distributed computing environments that include any of the above systems or devices, and the like.

As shown in FIG. 2, one or more client devices 240 may be in communication with one or more servers 206a-206n (generally referred to herein as "server(s) 206"). In one embodiment, the computing environment 200 may include a network appliance installed between the server(s) 206 and client machine(s) 240. The network appliance may manage client/server connections, and in some cases can load balance client connections amongst a plurality of backend servers 206.

The client machine(s) 240 may in some embodiments be referred to as a single client machine 240 or a single group of client machines 240, while server(s) 206 may be referred to as a single server 206 or a single group of servers 206. In one embodiment a single client machine 240 communicates with more than one server 206, while in another embodiment a single server 206 communicates with more than one client machine 240. In yet another embodiment, a single client machine 240 communicates with a single server 206.

A client machine 240 can, in some embodiments, be referenced by any one of the following non-exhaustive terms: client machine(s); client(s); client computer(s); client device(s); client computing device(s); local machine; remote machine; client node(s); endpoint(s); or endpoint node(s). The server 206, in some embodiments, may be referenced by any one of the following non-exhaustive terms: server(s), local machine; remote machine; server farm(s), or host computing device(s).

In one embodiment, the client machine 240 may be a virtual machine. The virtual machine may be any virtual machine, while in some embodiments the virtual machine may be any virtual machine managed by a Type 1 or Type 2 hypervisor, for example, a hypervisor developed by Citrix Systems, IBM, VMware, or any other hypervisor. In some aspects, the virtual machine may be managed by a hypervisor, while in other aspects the virtual machine may be managed by a hypervisor executing on a server 206 or a hypervisor executing on a client 240.

Some embodiments include a client device 240 that displays application output generated by an application remotely executing on a server 206 or other remotely located machine. In these embodiments, the client device 240 may execute a virtual machine receiver program or application to display the output in an application window, a browser, or other output window. In one example, the application is a desktop, while in other examples the application is an application that generates or presents a desktop. A desktop may include a graphical shell providing a user interface for an instance of an operating system in which local and/or remote applications can be integrated. Applications, as used herein, are programs that execute after an instance of an operating system (and, optionally, also the desktop) has been loaded.

The server 206, in some embodiments, uses a remote presentation protocol or other program to send data to a thin-client or remote-display application executing on the client to present display output generated by an application executing on the server 206. The thin-client or remote-display protocol can be any one of the following non-exhaustive list of protocols: the Independent Computing Architecture (ICA) protocol developed by Citrix Systems, Inc. of Ft. Lauderdale, Fla.; or the Remote Desktop Protocol (RDP) manufactured by the Microsoft Corporation of Redmond, Wash.

A remote computing environment may include more than one server 206a-206n such that the servers 206a-206n are logically grouped together into a server farm 206, for example, in a cloud computing environment. The server farm 206 may include servers 206 that are geographically dispersed while logically grouped together, or servers 206 that are located proximate to each other while logically grouped together. Geographically dispersed servers 206a-206n within a server farm 206 can, in some embodiments, communicate using a WAN (wide), MAN (metropolitan), or LAN (local), where different geographic regions can be characterized as: different continents; different regions of a continent; different countries; different states; different cities; different campuses; different rooms; or any combination of the preceding geographical locations. In some embodiments the server farm 206 may be administered as a single entity, while in other embodiments the server farm 206 can include multiple server farms.

In some embodiments, a server farm may include servers 206 that execute a substantially similar type of operating system platform (e.g., WINDOWS, UNIX, LINUX, iOS, ANDROID, etc.) In other embodiments, server farm 206 may include a first group of one or more servers that execute a first type of operating system platform, and a second group of one or more servers that execute a second type of operating system platform.

Server 206 may be configured as any type of server, as needed, e.g., a file server, an application server, a web server, a proxy server, an appliance, a network appliance, a gateway, an application gateway, a gateway server, a virtualization server, a deployment server, a Secure Sockets Layer (SSL) VPN server, a firewall, a web server, an application server or as a master application server, a server executing an active directory, or a server executing an application acceleration program that provides firewall functionality, application functionality, or load balancing functionality. Other server types may also be used.

Some embodiments include a first server 206a that receives requests from a client machine 240, forwards the request to a second server 206b (not shown), and responds to the request generated by the client machine 240 with a response from the second server 206b (not shown.) First server 206a may acquire an enumeration of applications available to the client machine 240 as well as address information associated with an application server 206 hosting an application identified within the enumeration of applications. First server 206a can then present a response to the client's request using a web interface, and communicate directly with the client 240 to provide the client 240 with access to an identified application. One or more clients 240 and/or one or more servers 206 may transmit data over network 230, e.g., network 101.

Figure 3:
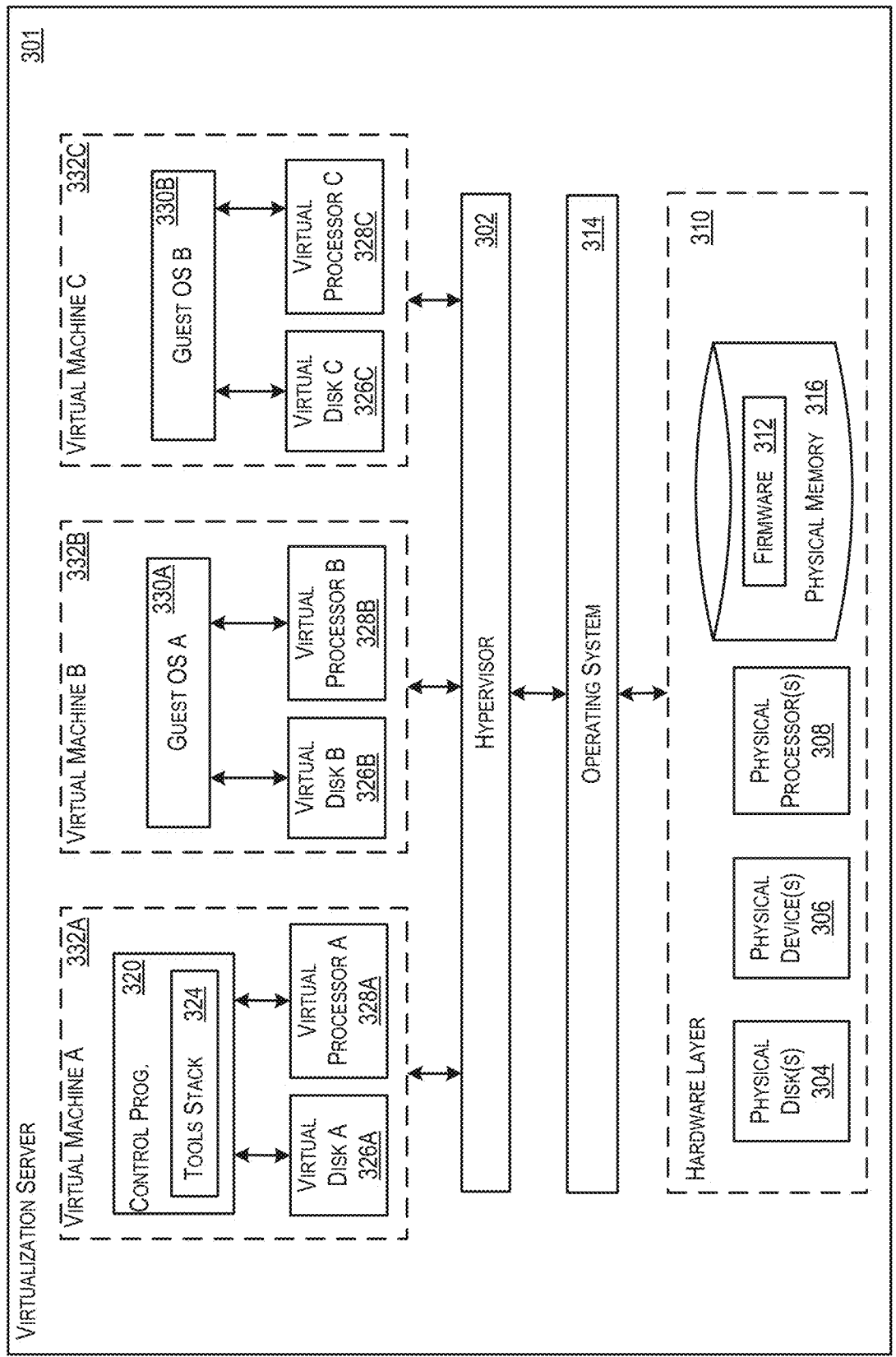
FIG. 3 depicts an illustrative virtualized system architecture that may be used in accordance with one or more illustrative aspects described herein.

FIG. 3 shows a high-level architecture of an illustrative desktop virtualization system. As shown, the desktop virtualization system may be single-server or multi-server system, or cloud system, including at least one virtualization server 301 configured to provide virtual desktops and/or virtual applications to one or more client access devices 240. As used herein, a desktop refers to a graphical environment or space in which one or more applications may be hosted and/or executed. A desktop may include a graphical shell providing a user interface for an instance of an operating system in which local and/or remote applications can be integrated. Applications may include programs that execute after an instance of an operating system (and, optionally, also the desktop) has been loaded. Each instance of the operating system may be physical (e.g., one operating system per device) or virtual (e.g., many instances of an OS running on a single device). Each application may be executed on a local device, or executed on a remotely located device (e.g., remoted).

A computer device 301 may be configured as a virtualization server in a virtualization environment, for example, a single-server, multi-server, or cloud computing environment. Virtualization server 301 illustrated in FIG. 3 can be deployed as and/or implemented by one or more embodiments of the server 206 illustrated in FIG. 2 or by other known computing devices. Included in virtualization server 301 is a hardware layer that can include one or more physical disks 304, one or more physical devices 306, one or more physical processors 308, and one or more physical memories 316. In some embodiments, firmware 312 can be stored within a memory element in the physical memory 316 and can be executed by one or more of the physical processors 308. Virtualization server 301 may further include an operating system 314 that may be stored in a memory element in the physical memory 316 and executed by one or more of the physical processors 308. Still further, a hypervisor 302 may be stored in a memory element in the physical memory 316 and can be executed by one or more of the physical processors 308.

Executing on one or more of the physical processors 308 may be one or more virtual machines 332A-C (generally 332). Each virtual machine 332 may have a virtual disk 326A-C and a virtual processor 328A-C. In some embodiments, a first virtual machine 332A may execute, using a virtual processor 328A, a control program 320 that includes a tools stack 324. Control program 320 may be referred to as a control virtual machine, Dom0, Domain 0, or other virtual machine used for system administration and/or control. In some embodiments, one or more virtual machines 332B-C can execute, using a virtual processor 328B-C, a guest operating system 330A-B.

Virtualization server 301 may include a hardware layer 310 with one or more pieces of hardware that communicate with the virtualization server 301. In some embodiments, the hardware layer 310 can include one or more physical disks 304, one or more physical devices 306, one or more physical processors 308, and one or more physical memory 316. Physical components 304, 306, 308, and 316 may include, for example, any of the components described above. Physical devices 306 may include, for example, a network interface card, a video card, a keyboard, a mouse, an input device, a monitor, a display device, speakers, an optical drive, a storage device, a universal serial bus connection, a printer, a scanner, a network element (e.g., router, firewall, network address translator, load balancer, virtual private network (VPN) gateway, Dynamic Host Configuration Protocol (DHCP) router, etc.), or any device connected to or communicating with virtualization server 301. Physical memory 316 in the hardware layer 310 may include any type of memory. Physical memory 316 may store data, and in some embodiments may store one or more programs, or set of executable instructions. FIG. 3 illustrates an embodiment where firmware 312 is stored within the physical memory 316 of virtualization server 301. Programs or executable instructions stored in the physical memory 316 can be executed by the one or more processors 308 of virtualization server 301.

Virtualization server 301 may also include a hypervisor 302. In some embodiments, hypervisor 302 may be a program executed by processors 308 on virtualization server 301 to create and manage any number of virtual machines 332. Hypervisor 302 may be referred to as a virtual machine monitor, or platform virtualization software. In some embodiments, hypervisor 302 can be any combination of executable instructions and hardware that monitors virtual machines executing on a computing machine. Hypervisor 302 may be Type 2 hypervisor, where the hypervisor executes within an operating system 314 executing on the virtualization server 301. Virtual machines may then execute at a level above the hypervisor 302. In some embodiments, the Type 2 hypervisor may execute within the context of a user's operating system such that the Type 2 hypervisor interacts with the user's operating system. In other embodiments, one or more virtualization servers 301 in a virtualization environment may instead include a Type 1 hypervisor (not shown). A Type 1 hypervisor may execute on the virtualization server 301 by directly accessing the hardware and resources within the hardware layer 310. That is, while a Type 2 hypervisor 302 accesses system resources through a host operating system 314, as shown, a Type 1 hypervisor may directly access all system resources without the host operating system 314. A Type 1 hypervisor may execute directly on one or more physical processors 308 of virtualization server 301, and may include program data stored in the physical memory 316.

Hypervisor 302, in some embodiments, can provide virtual resources to operating systems 330 or control programs 320 executing on virtual machines 332 in any manner that simulates the operating systems 330 or control programs 320 having direct access to system resources. System resources can include, but are not limited to, physical devices 306, physical disks 304, physical processors 308, physical memory 316, and any other component included in hardware layer 310 of the virtualization server 301. Hypervisor 302 may be used to emulate virtual hardware, partition physical hardware, virtualize physical hardware, and/or execute virtual machines that provide access to computing environments. In still other embodiments, hypervisor 302 may control processor scheduling and memory partitioning for a virtual machine 332 executing on virtualization server 301. Hypervisor 302 may include those manufactured by VMWare, Inc., of Palo Alto, Calif.; HyperV, VirtualServer or virtual PC hypervisors provided by Microsoft, or others. In some embodiments, virtualization server 301 may execute a hypervisor 302 that creates a virtual machine platform on which guest operating systems may execute. In these embodiments, the virtualization server 301 may be referred to as a host server. An example of such a virtualization server is the Citrix Hypervisor provided by Citrix Systems, Inc., of Fort Lauderdale, Fla.

Hypervisor 302 may create one or more virtual machines 332B-C (generally 332) in which guest operating systems 330 execute. In some embodiments, hypervisor 302 may load a virtual machine image to create a virtual machine 332. In other embodiments, the hypervisor 302 may execute a guest operating system 330 within virtual machine 332. In still other embodiments, virtual machine 332 may execute guest operating system 330.

In addition to creating virtual machines 332, hypervisor 302 may control the execution of at least one virtual machine 332. In other embodiments, hypervisor 302 may present at least one virtual machine 332 with an abstraction of at least one hardware resource provided by the virtualization server 301 (e.g., any hardware resource available within the hardware layer 310). In other embodiments, hypervisor 302 may control the manner in which virtual machines 332 access physical processors 308 available in virtualization server 301. Controlling access to physical processors 308 may include determining whether a virtual machine 332 should have access to a processor 308, and how physical processor capabilities are presented to the virtual machine 332.

As shown in FIG. 3, virtualization server 301 may host or execute one or more virtual machines 332. A virtual machine 332 is a set of executable instructions that, when executed by a processor 308, may imitate the operation of a physical computer such that the virtual machine 332 can execute programs and processes much like a physical computing device. While FIG. 3 illustrates an embodiment where a virtualization server 301 hosts three virtual machines 332, in other embodiments virtualization server 301 can host any number of virtual machines 332. Hypervisor 302, in some embodiments, may provide each virtual machine 332 with a unique virtual view of the physical hardware, memory, processor, and other system resources available to that virtual machine 332. In some embodiments, the unique virtual view can be based on one or more of virtual machine permissions, application of a policy engine to one or more virtual machine identifiers, a user accessing a virtual machine, the applications executing on a virtual machine, networks accessed by a virtual machine, or any other desired criteria. For instance, hypervisor 302 may create one or more unsecure virtual machines 332 and one or more secure virtual machines 332. Unsecure virtual machines 332 may be prevented from accessing resources, hardware, memory locations, and programs that secure virtual machines 332 may be permitted to access. In other embodiments, hypervisor 302 may provide each virtual machine 332 with a substantially similar virtual view of the physical hardware, memory, processor, and other system resources available to the virtual machines 332.

Each virtual machine 332 may include a virtual disk 326A-C (generally 326) and a virtual processor 328A-C (generally 328.) The virtual disk 326, in some embodiments, is a virtualized view of one or more physical disks 304 of the virtualization server 301, or a portion of one or more physical disks 304 of the virtualization server 301. The virtualized view of the physical disks 304 can be generated, provided, and managed by the hypervisor 302. In some embodiments, hypervisor 302 provides each virtual machine 332 with a unique view of the physical disks 304. Thus, in these embodiments, the particular virtual disk 326 included in each virtual machine 332 can be unique when compared with the other virtual disks 326.

A virtual processor 328 can be a virtualized view of one or more physical processors 308 of the virtualization server 301. In some embodiments, the virtualized view of the physical processors 308 can be generated, provided, and managed by hypervisor 302. In some embodiments, virtual processor 328 has substantially all of the same characteristics of at least one physical processor 308. In other embodiments, virtual processor 308 provides a modified view of physical processors 308 such that at least some of the characteristics of the virtual processor 328 are different than the characteristics of the corresponding physical processor 308.

Distance Based Session Roaming

Users typically access their mobile workspaces from different mobile devices regardless of location or network. For example, in the healthcare industry, employees may access a variety of applications at various times, locations and networks. As another example, a user may use several mobile devices, such as, a smartphone and a tablet. The user may switch between the mobile devices based on application context. For example, due to the relatively larger screen size of the tablet device, the user may prefer to launch and access visually intensive applications, such as, AutoCAD, Visio, or Photoshop, from the tablet device instead of the smartphone. However, the user may find it more convenient to launch and access less visually intensive applications, such as, Outlook, or Skype for Business from the smartphone instead of the tablet. Typically, when a user switches sessions between devices, the user authenticates the sessions by providing user account information, password, and/or pin code input or other credentials. However, when the user is frequently switching sessions between devices, authenticating sessions may result in the user reducing or even stopping switching across mobile devices. As a result, the user may reduce switching sessions across devices or may stop switching sessions between devices and continue to work on a device that may not be suited for the task at hand. For example, the user may continue to access and work on architectural drawings in the smaller display of a smartphone instead of switching to the larger display of a tablet. This negatively impacts user experience, and user productivity.

Systems and methods according to this disclosure provide automatic session roaming across mobile devices based on proximity authentication. Upon detecting an indication to initiate session roaming of a remote session launched on a source device, the source device may automatically roam the session from the source device to a target device. A target device may be selected from among one or more mobile devices within a logical device group based on a proximity to the source device. The remote session is handed over from the source device to the target device as an authenticated user session. Thus, the user may access the remote session on the target device without providing additional logon, password, user account, pin code or other credentials, thus decreasing the risk of password leak, especially in public or hostile environment. Systems and methods of this disclosure improve user experience by reducing the interruption due to user authentication of remote session handover across mobile devices within a logical device group. Additionally, mobile devices may originate seamless session roaming regardless of whether the source device and the target device are connected to WAN or LAN. In other words, the mobile devices may be connected to different network types. Systems and methods of this disclosure provide seamless and automatic session roaming based on proximity authentication without the need for extra hub hardware.

Figure 4:
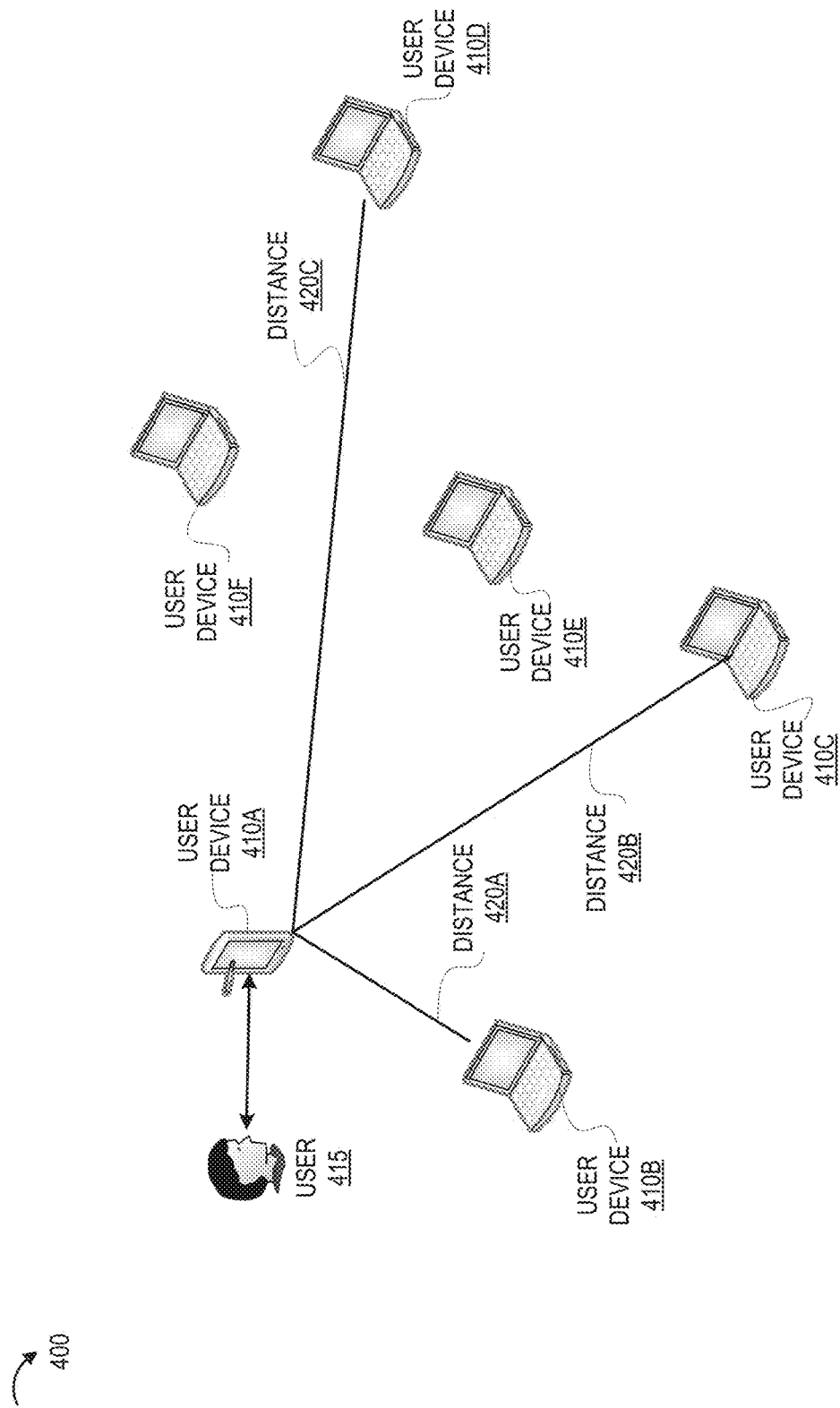
FIG. 4 depicts an illustrative environment in which session roaming based on proximity authentication is provided in accordance with one or more illustrative aspects described herein.

FIG. 4 depicts an illustrative environment 400 in which session roaming based on proximity authentication is provided in accordance with one or more illustrative aspects described herein. The environment 400 includes six mobile devices, such as, the user devices 410a-f (generally referred to as user devices 410). In some implementations, the user devices 410 may each be a computing device 210 shown in FIG. 2. A user 415 may launch a session of a mobile workspace of the user 415 on the first user device 410a. The user 415 may interact with various applications within the active session launched on the first user device 410a.

Based on an indication to initiate session roaming, the session launched on the first user device 410a may roam from the first user device 410a to a target user device. The target user device is different from the first user device 410a and may be selected from among the user devices 410. The target user device may be selected from one or more trusted user device groups associated with the first user device 410a. A trusted user device group may be a logical grouping of one or more of the user devices 410. A user device 410 may belong to more than one trusted user device group. A session of a mobile workspace launched on any user device 410 that belongs to a trusted user device group is authorized to roam across any of the user devices 410 that also belong to the same trusted user device group. In FIG. 4, the trusted user device group associated with the first user device 410 may include the first user device 410a, the second user device 410b, the third user device 410c, and the fourth user device 410d. Therefore, a session launched on any of the first, second, third or fourth user devices 410a-d may roam across each other. Since the fifth and sixth user devices 410e-f do not belong to the same trusted user device group as the first user device 410a, a session launched on the first user device 410a is not authorized to roam across the fifth or sixth user devices 410e-f. A detailed discussion about device grouping is provided with reference to FIG. 7.

The target user device may be selected from the second through fourth user devices 410b-d belonging to the trusted user device group based on a physical proximity of the second through fourth user devices 410b-d to the first user device 410a. FIG. 4 shows a distance between the first user device 410a and each of the second, third, and fourth user devices 410b-d, respectively, as a first distance 420a, a second distance 420b, and a third distance 420c (generally referred to as distances 420). The distances 420 between the first user device 410a and each of the second, third and fourth user devices 410b-d may be determined based on the geographic location information of each of the first, second, third and fourth user devices 410a-d. In FIG. 4, the second user device 410b is located closest to the first user device 410a. Thus, the second user device 410b may be selected as the target user device, and the session on the first user device 410a may be roamed from the first user device 410a to the second user device 410b. The session of the mobile workspace is launched on the second user device 410b as a user authenticated session. The session running on the first user device 410a may be disconnected. Since the session is launched on the second user device 410b as a user authenticated session, the user 415 need not provide additional user login or pin code input to access the session from the second user device 410b. Thus, session roaming based on proximity authentication of user devices belonging to a trusted user device group, decreases the risk of password leak or theft, especially in a public or otherwise unsecure environment. In some implementations, the first and second user devices 410a-b may each be connected to a different network type, such as WAN or LAN.

In some implementations, session roaming may be initiated based on a user gesture or a policy rule. By providing a user gesture, the user 415 of the first user device 410a may push an active session from the first user device 410a to a different user device, such as the second user device 410b, if both the first user device 410a and the second user device 410b belong to the same trusted user device group and both the first user device 410a and the second user device 410b are located within a predetermined distance from each other. In some implementations, session roaming may be initiated based on a policy rule. The policy rule may specify a battery usage threshold for one or more of the user devices 410. If the policy rule specifies a battery usage threshold for the first user device 410a, the battery usage of the first user device 410a may be periodically monitored. Upon detecting that the battery usage of the first user device 410a is below the battery usage threshold specified by the policy rule, an active session running on the first user device 410a may be roamed from the first user device 410a to a different one of the user devices 410 that belongs to the same trusted user device group as the first user device 410a and is physically located within a predetermined distance from the first user device 410a. Once a target user device is selected, the session is launched on the target user device as a user authenticated session.

Figure 5A:
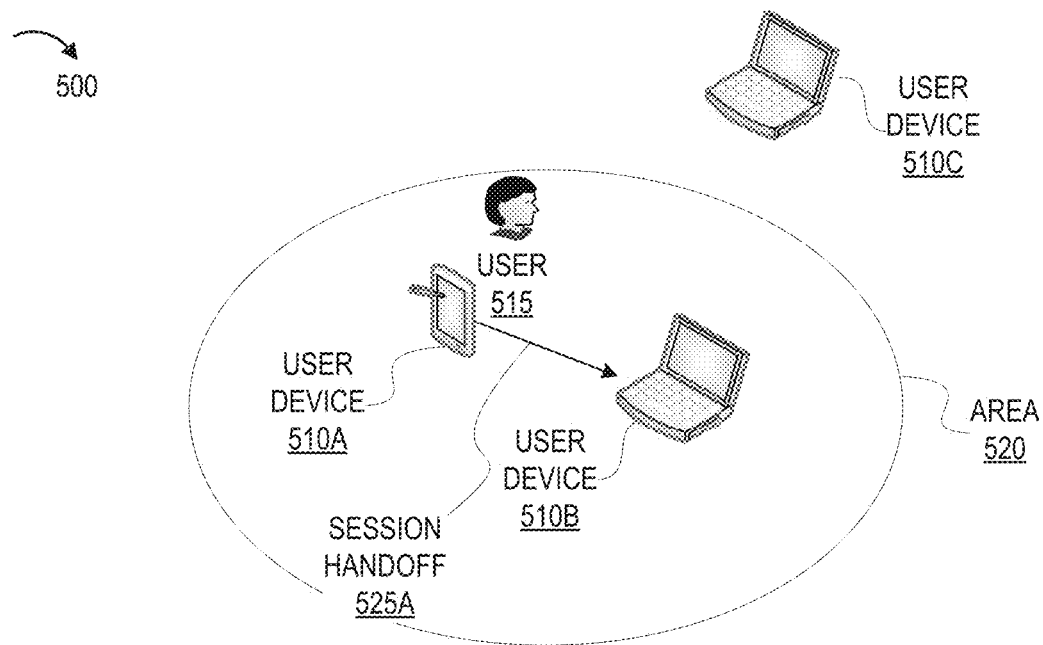
FIGS. 5A and 5B depict another illustrative environment in which session roaming based on proximity authentication is provided in accordance with one or more illustrative aspects described herein.
Figure 5B:
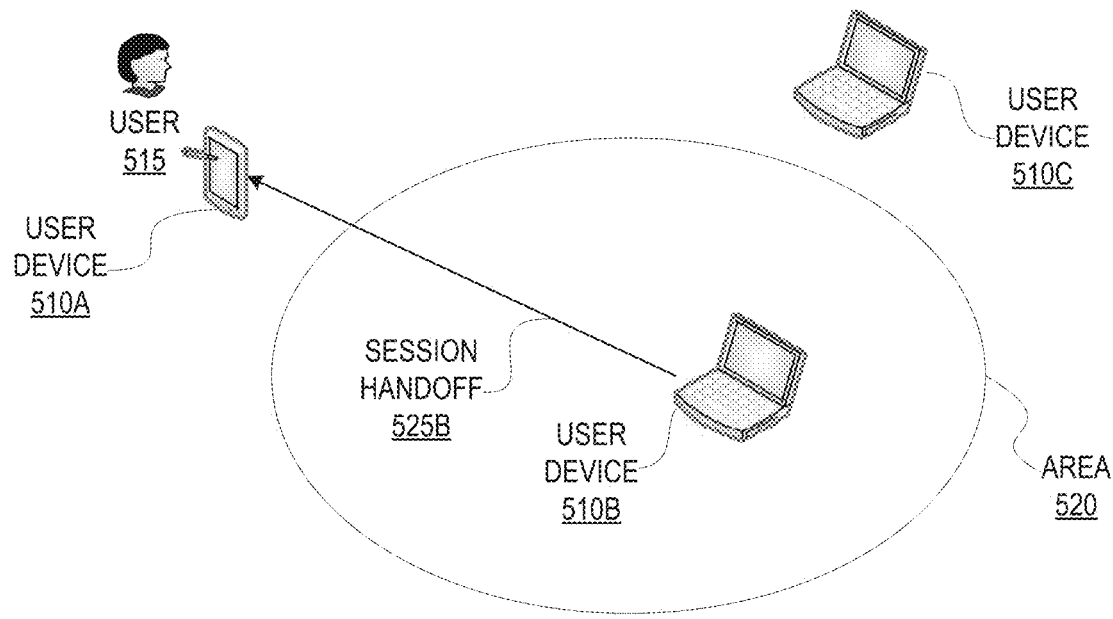

FIGS. 5A and 5B depict another illustrative environment 500 in which session roaming based on proximity authentication is provided in accordance with one or more illustrative aspects described herein. The environment 500 includes a first, second, and third user device 510a-c (generally referred to as user devices 510). A user 515, such as a physician, may travel to different wards or areas within a hospital in order to check on patients. The first user device 510a may be a mobile device, such as a smartphone or tablet, that travels with the user 515. One or more of the user devices 510, such as the second and third user devices 510b-c may be located in different wards or areas of the hospital. Upon entering a ward or area 520, the user 515 may use the second or third user devices 510b-c to access various patient information. The second and third user devices 510b-c may include a larger screen, additional applications, and/or different hardware. The second and third user devices 510b-c may be on a different network and/or mobile platform than the first user device 510a.

The user 515 may launch a session on the first user device 510a. In some implementations, a policy rule may identify a master device, such as the first user device 510a. The first user device 510a (master device) may belong to a trusted user device group that includes the second and third user devices 510b-c. The second and third user devices 510b-c may be designated as slave devices in relation to the first user device 510a (master device). The user devices 510 may periodically report their geographic location. The distance between the first user device 510a (master device) and each of the second and third user devices 510b-c (slave devices) may be monitored based on the geographic locations of each of the user devices 510. As shown in FIG. 5A, upon detecting that the first user device 510a (master device) is within a predetermined distance from the second user device 510b (slave device) or within a predetermined range of the second user device 510b (slave device), the active session running on the first user device 510a may be automatically roamed from the first user device 510a to the second user device 510b (shown in FIG. 5A as the first session handoff 525a). The session may be launched on the second user device 510b as a user authenticated session. Thus, the user 515 may access the session launched on the second user device 510b without additional authentication, such as providing additional login, user account, password or other credentials. As shown in FIG. 5B, when the user 515 leaves the ward or the area 520, the first user device 510a travels with the user 515. Subsequently, upon detecting that the second user device 510b (slave device) is out of range of the first user device 510a (master device), the active session on the second user device 510b may be roamed and handed over to the first user device 510a as a user authenticated session (shown in FIG. 5B as the second session handoff 525b). The user 515 may access the session on the first user device 510a while travelling to another ward or area of the hospital.

In some implementations, session roaming based on proximity authentication may be provided between a fixed user device and a mobile user device. The user may be, for example, an insurance agent, that frequently shuttles back and forth between the office and various customer sites. The fixed user device may reside in the office and the mobile user device may travel with the user. A policy rule may define the mobile user device as a master device. The mobile user device and the fixed user device may both belong to the same trusted user device group. The fixed user device may be designated as a slave device relative to the mobile user device. The mobile user device may report the longitude and latitude information corresponding to its physical location. The distance between the mobile user device and the fixed device may be periodically monitored. Upon detecting that the mobile user device is within a predetermined distance from the fixed user device, an active session running on the mobile user device may be handed over to the fixed user device. The session may be launched on the fixed user device as a user authenticated session. Further, upon detecting that the mobile user device is outside of a predetermined distance or range from the fixed user device, the active session on the fixed user device is handed over to the mobile user device as a user authenticated session. Thus, the user may have continuous authenticated access to the user's mobile workspace anywhere and at any time.

Figure 6:
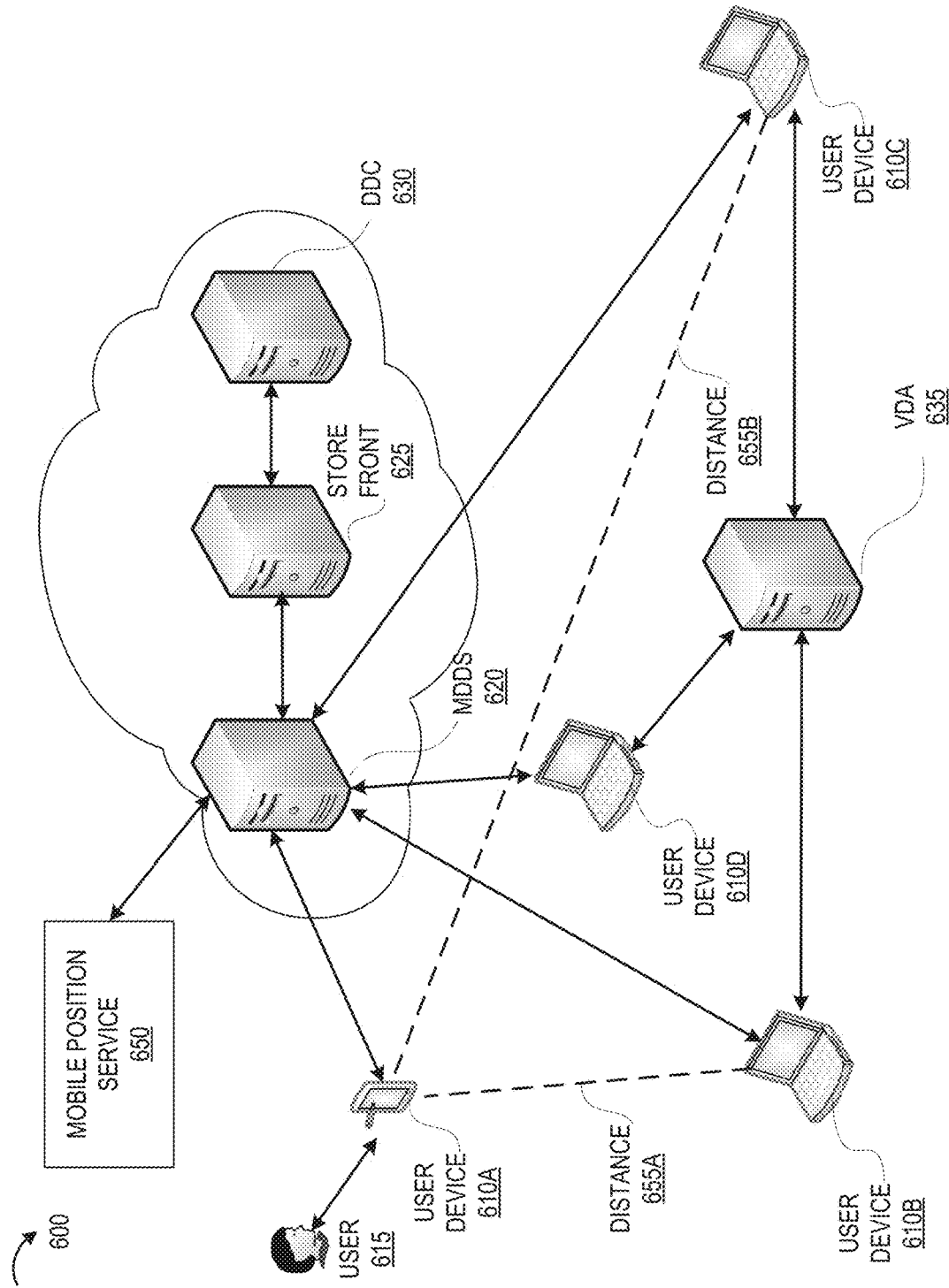
FIG. 6 depicts an illustrative session roaming based on proximity authentication is provided in accordance with one or more illustrative aspects described herein.

FIG. 6 depicts an illustrative system 600 that provides session roaming based on proximity authentication in accordance with one or more illustrative aspects described herein. The system 600 includes a first, second, third, and fourth user device 610a-d (generally referred to as user devices 610). In some implementations, the user devices 610 may each be a computing device 210 shown in FIG. 2. The environment 600 includes a Mobile Device Discovery Service (MDDS) 620, a Store Front 625, a Desktop Delivery Controller (DDS) 630, and a Virtual Delivery Agent (VDA) 635. In some implementations, the MDDS 620, the Store Front 625, the DDS 630, and the VDA 635 may each be hosted on a server, such as a server 206 shown in FIG. 2. In some implementations, the Store Front 625 may be an enterprise application store, such as a Citrix StoreFront, that provides an interface for users to access, for example, Citrix XenDesktop and Citrix XenApp virtual desktops and applications remotely. Upon connecting to the Internet, the user devices 610 may each initiate a TCP connection to the MDDS 620 for user device registration. The MDDS 620 may maintain the TCP connection to each user device 610 in the form of a persistent TCP connection. In other words, a periodic heartbeat mechanism may track whether a user device 610 is online/offline and/or whether any configuration change is detected for a user device 610, such as, a change of geographic location, a change in network type, etc.

A user 615 may launch a session of a mobile workspace on the first user device 610a. The user 615 may access and interact with various applications within the active session on the first user device 610a. The applications may be provided by the Store Front 625. Based on an indication to initiate session roaming, the user device 610a may originate a session roaming request to the MDDS 620. Based on an indication to initiate session roaming, the session launched on the first user device 610a may roam from the first user device 610a to a target user device. The target user device is different from the first user device 610a and may be selected from among the user devices 610. The target user device may be selected from one or more trusted user device groups associated with the first user device 610a. A trusted user device group is a logical grouping of one or more of the user devices 610. A user device 610 may belong to more than one trusted user device group. A session of a mobile workspace launched on any user device belonging to the same trusted user device group is authorized to roam across any of the user devices 610 also belonging to the same trusted user device group based on physical or geographic proximity, for example, less than 50 meters apart. In FIG. 6, the first user device 610a may belong to a trusted user device group that also includes the second and third user devices 610b-c. Therefore, a session launched on any of the first, second, or third user devices 610a-c may be authorized to roam across each other based on proximity. Since the fourth user device 610d does not belong to the same trusted user device group as the first, second and third user devices 610a-c, a session launched on any of the first through third user devices 610a-c is not authorized to roam to the fourth user device 610d.

The MDDS 620 may be a WAN-wide cloud service configured to locate mobile devices, such as the user devices 610, in real time. The system 600 also includes a Mobile Position Service (MPS) 650. In some implementations, the MPS 650 may be integrated with an application, such as Citrix Receiver or Citrix Workspace, configured to enable client devices, such as the user devices 610, to connect to various desktop virtualization services that are offered by the Store Front 625. An application, such as Citrix Receiver, may reside on each of the user devices 610 and may record information about the Store Front 625 to which a current active session on the user device 610 is connected to. The MPS 650 may periodically report to the MDDS 620, the geographic positions or locations of the user devices 610, and the network information associated with each of the user devices 610. The MPS 650 may report geographic location information and associated network information of a user device during service startup or reboot of the user device. The MPS 650 may report geographic location information and associated network information when a user device travels across network boundaries. Geographic location information may include longitude and latitude data, while network information associated with a user device may include, but is not limited to, an IP address, and/or a network type identifying whether an active session on a user device is originating from WAN or LAN.

Based on an indication to initiate session roaming, the first user device 610a may originate a session roaming request to the MDDS 620. As discussed above, an indication to initiate session roaming may be based on a user gesture or a policy rule. The session roaming request may include information related to the enterprise application store, such the Store Front 625, that the first user device 610a is connected to. The session roaming request may also identify a target user device name. The target user device may be selected from among the second or third user devices 410b-c, based on a proximity to the first user device 610a. FIG. 6 shows a first distance 655a between the first user device 610a and the second user device 610b, and a second distance 655b between the first user device 610 and the third user device 610c. The first and second distance 655a-b may be determined based on the geographic location information of each of the first, second, third user devices 410a-d. In FIG. 6, the first and second distance 655a-b indicate that the second user device 610b is located closest to the first user device 610a. Therefore, the second user device 610b may be selected as the target device.

Based on receiving the session roaming request from the first user device 610a to roam the session on the first user device 610a to the target user device, such as the second user device 610b, the MDDS 620 may request information about the session from the Store Front 625, such as, the device names of all the user devices 610 on which the session is launched. As previously discussed, in some implementations, the MPS 650 may be integrated with an application, such as Citrix Receiver or Citrix Workspace, configured to enable client devices, such as the user devices 610, to connect to various desktop virtualization services that are offered by the Store Front 625. The application, such as Citrix Receiver, may reside on user devices 610 and may record information about the Store Front 625 to which each session is connected to.

Based on receiving the requested information, such as, the device names of all the user devices 610 on which the session is launched, from the Store Front 625, the MDDS 620 may request the second user device 610*b* to report information about a network type identifying whether the second user device 610*b* on WAN or LAN. The MDDS 620 may send an ICA file request to the Store Front 625. The Store Front 625 may receive data from the DDC 630. Based on receiving data from the DDC 630, the beacon detection results, store name, and other relevant information, the Store Front 625 may create the ICA file. The Store Front 625 may send the ICA file to the MDDS 620. The MDDS 620 may receive the ICA file from the Store Front 625 and relay the ICA file to the second user device 610*b* by leveraging a persistent TCP connection that the MDDS 620 maintains with each of the user devices 610. The MDDS 620 may launch the session as a user authenticated session from the second user device 610*b*. The MDDS 620 may then close the session from the first user device 610*a*.

Figure 7:
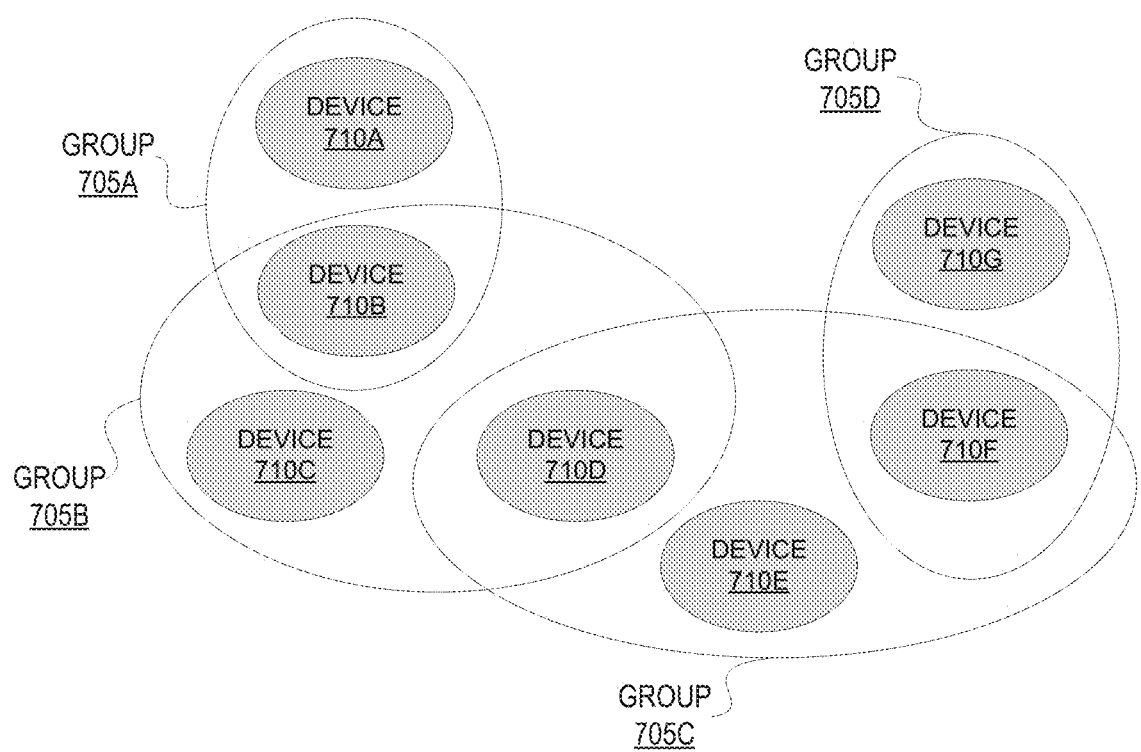
FIG. 7 depicts device groups in accordance with one or more illustrative aspects described herein.

As discussed above trusted user device groups (or device groups) are logical grouping of one or more of devices, such as the user devices 610 in FIG. 6. Grouping user mobile devices facilitates efficient management of secure session roaming across mobile devices. FIG. 7 depicts device groups in accordance with one or more illustrative aspects described herein. A device group may be maintained by the MDDS 620 shown in FIG. 6, but individual user devices may cache relevant device group information locally in order to avoid frequently querying the MDDS 620 for device group information.

FIG. 7 shows four logical groupings of devices, such as device groups 705*a-d*. The first device group 705*a* is a logical grouping of a first device 710*a* and a second device 710*b*. The second user device group 705*b* is a logical grouping that includes the second device 710*b*, a third device 710*c*, and a fourth device 710*d*. The third device group 705*c* is a logical grouping the includes the fourth device 710*d*, a fifth device 710*e*, and a sixth device 710*f*. The fourth device group 705*d* is a logical grouping that includes the sixth device 710*f* and a seventh device 710*g*. As shown in FIG. 7, a device group, such as the second and third device groups 705*b-c* may include two or more devices. Further, one device may join one or more device groups. For example, in FIG. 7, the fourth device 710*d* belongs to both the second and third device groups 705*b-c*.

A device may create a device group with itself as the device group owner. Referring to FIG. 6, the first user device 610*a* may request the MDDS 620 to create a device group designating the requesting first user device 610*a* as the device group owner. In response to the request, the MDDS 620 may return a random generated PIN code representing the device group identification to the first user device 610*a*. If other user devices 610 want to join the device group created by the first user device 610*a*, the PIN code representing the device group identification is shared with them. Since any user device 610 may request creation of a device group, the MDDS 620 may delete a device group if no user device 610 joins that device group within a predetermined length of time after the device group is created in order to avoid too many device groups with only a single user.

A user device 610 may join an existing device group by sending the MDDS 620 a request that includes the device group PIN code or identification. Based on receiving a request from a user device 610 to join a device group, the MDDS 620 may identify the device group within a database using the device group PIN code or identification. The MDDS 620 may then determine the geographic distance between the user device 610 designated as the device group owner and the user device 610 requesting to join. The requesting user device 610 may be authorized to join the device group based on providing a valid and unexpired invitation code. The invitation code may be valid for a predetermined length of time after the device group is created. The requesting user device 610 may be allowed to join the device group when the user device that is designated as the device group owner and the requesting user device are physically within a predetermined distance from each other, for example, less than 50 meters. Providing an unexpired invitation code and being with a predetermined distance reduces the risk of hacking by unauthorized user devices and thereby, improves the security of device groups.

A user device 610 may leave a group that it created or any device groups that it joined. The MDDS 620 may delete or remove a device group whenever the device group owner leaves the device group, or the device group owner is the only member of the device group for longer than a predetermined length of time.

Figure 8:
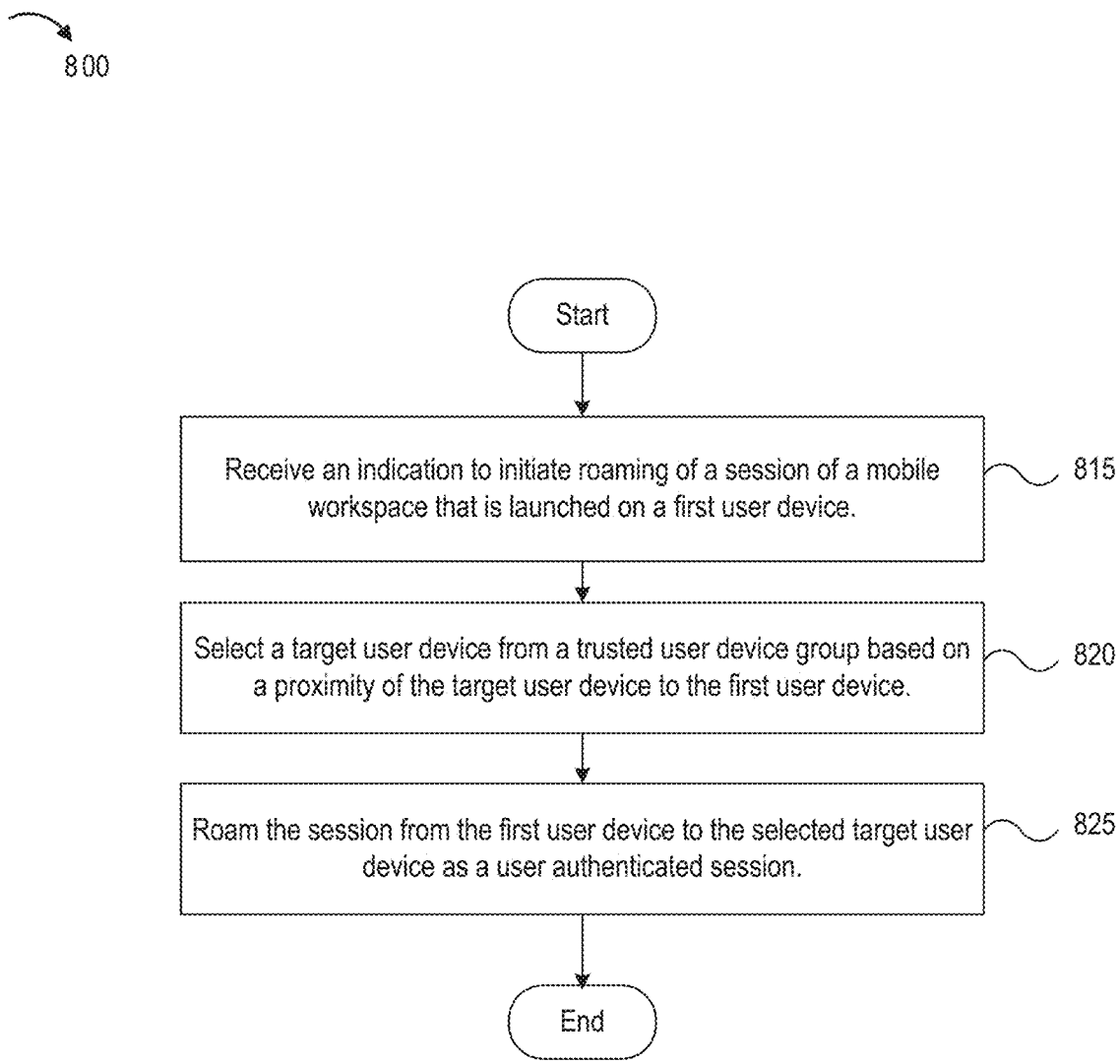
FIG. 8 illustrates an example process for session roaming based on proximity authentication performed by the example system of FIG. 6.

FIG. 8 illustrates an example process 800 for providing automatic session roaming based on proximity authentication performed by the example system in FIG. 6. While FIG. 8 is described with reference to FIG. 6, it should be noted that the method steps of FIG. 8 may be performed by other systems.

A user 615 may launch an active session of a mobile workspace on the first user device 610*a*. The user 615 may access and interact with various applications within the active session on the first user device 610*a*. The applications may be provided by the Store Front 625. The user devices 610 may each initiate a TCP connection to the MDDS 620 for user device registration upon connecting to the Internet. The MDDS 620 may maintain the TCP connection to each user device 610 in the form of a persistent TCP connection. In other words, a periodic heartbeat mechanism may track whether a user device 610 is online or whether any configuration information change is detected for a user device 610, such as, a change of geographic location, a change in network condition, etc.

The process 800 begins at stage 815 when the first user device 610*a* initiates session roaming, the first user device 610*a* may originate a session roaming request to the MDDS 620. Based on an indication to initiate session roaming, the user device 610*a* may originate a session roaming request to the MDDS 620. At stage 820, the process 800 includes selecting a target user device from a trusted user device group based on a proximity of the target user device to the first user device 610*a*. Based on an indication to initiate session roaming, the session launched on the first user device 610*a* may roam from the first user device 610*a* to a target user device. The target user device is different from the first user device 610*a* and may be selected from among the user devices 610. The target user device may be selected from one or more trusted user device groups associated with the first user device 610*a*. A trusted user device group is a logical grouping of one or more of the user devices 610. A user device 610 may belong to more than one trusted user device group. A session of a mobile workspace launched on any user device belonging to the same trusted user device group is authorized to roam across any of the user devices also belonging to the same trusted user device group based on physical or geographic proximity, for example, less than 50 meters apart. In FIG. 6, the first user device 610a may belong to a trusted user device group that also includes the second and third user devices 610b-c. Therefore, a session launched on any of the first, second, or third user devices 610a-c may be authorized to roam across each other based on proximity. Since the fourth user device 610d does not belong to the same trusted user device group as the first, second and third user devices 610a-c, a session launched on any of the first through third user devices 610a-c is not authorized to roam across the fourth user device 610d.

The MDDS 620 may be a WAN-wide cloud service configured to locate mobile devices, such as the user devices 610, in real time. The system 600 also includes a Mobile Position Service (MPS) 650. In some implementations, the MPS 650 may be integrated with an application, such as Citrix Receiver or Citrix Workspace, configured to enable client devices, such as the user devices 610, to connect to various desktop virtualization services that are offered by the Store Front 625. An application, such as Citrix Receiver, may reside on user devices 610 and may record information about the Store Front 625 to which a current active session is connected to. The MPS 650 may periodically report to the MDDS 620, the geographic positions or locations of the user devices 610, and the network information associated with each of the user devices 610. The MPS 650 may report geographic location information and associated network information of a user device during service startup or reboot of the user device. The MPS 650 may report geographic location information and associated network information when a user device travels across network boundaries. Geographic location information may include longitude and latitude data, while network information associated with a user device may include, but is not limited to, an IP address, and/or a network type identifying whether an active session on a user device is originating from WAN or LAN.

Based on an indication to initiate session roaming, the first user device 610a may originate a session roaming request to the MDDS 620. As discussed above, an indication to initiate session roaming may be based on a user gesture or a policy rule. The session roaming request may include information related to the enterprise application store, such the Store Front 625, that provides an interface for users to access virtual desktops and applications remotely. The session roaming request may identify the target user device name. The target user device may be selected from among the second or third user devices 410b-c, based on their physical proximity to the first user device 610a. FIG. 6 shows a distance between the first user device 610a and the second user device 610b as a first distance 655a and a distance between the first user device 610 and the third user device 610c as a second distance 655b. The distances 655 between the first user device 410a and each of the second, and third user devices 410b-d may be determined based on the geographic location information of each of the first, second, third user devices 410a-d. In FIG. 6, the distances 655 indicate that the second user device 610b is physically located closest to the first user device 610a. Therefore, the second user device 610b may be selected as the target device.

At stage 825, the process 800 includes roaming the session from the first user device 610a to the selected target user device as a user authenticated session. Based on receiving the session roaming request from the first user device 610a to roam the session on the first user device 610a to the second user device 610b, the MDDS 620 may request beacon data configured for the Store Front 625. Based on receiving the requested beacon data from the Store Front 625, the MDDS 620 may push the beacon data to the second user device 610b and request the second user device 610b to report beacon detection results including a network type identifying whether the second user device 610b on WAN or LAN. The MDDS 620 may send an ICA file request to the Store Front 625. The Store Front 625 may receive data from the DDC 630. Based on receiving data from the DDC 630, the beacon detection results, store name, and other relevant information, the Store Front 625 may create the ICA file. The Store Front 625 may send the ICA file to the MDDS 620. The MDDS 620 may receive the ICA file from the Store Front 625 and relay the ICA file to the second user device 610b by leveraging a persistent TCP connection that the MDDS 620 maintains with each of the user devices 610. The MDDS 620 may launch the session as a user authenticated session from the second user device 610b. The MDDS 620 may then close the session from the first user device 610a and the process 800 ends.

Figure 9:
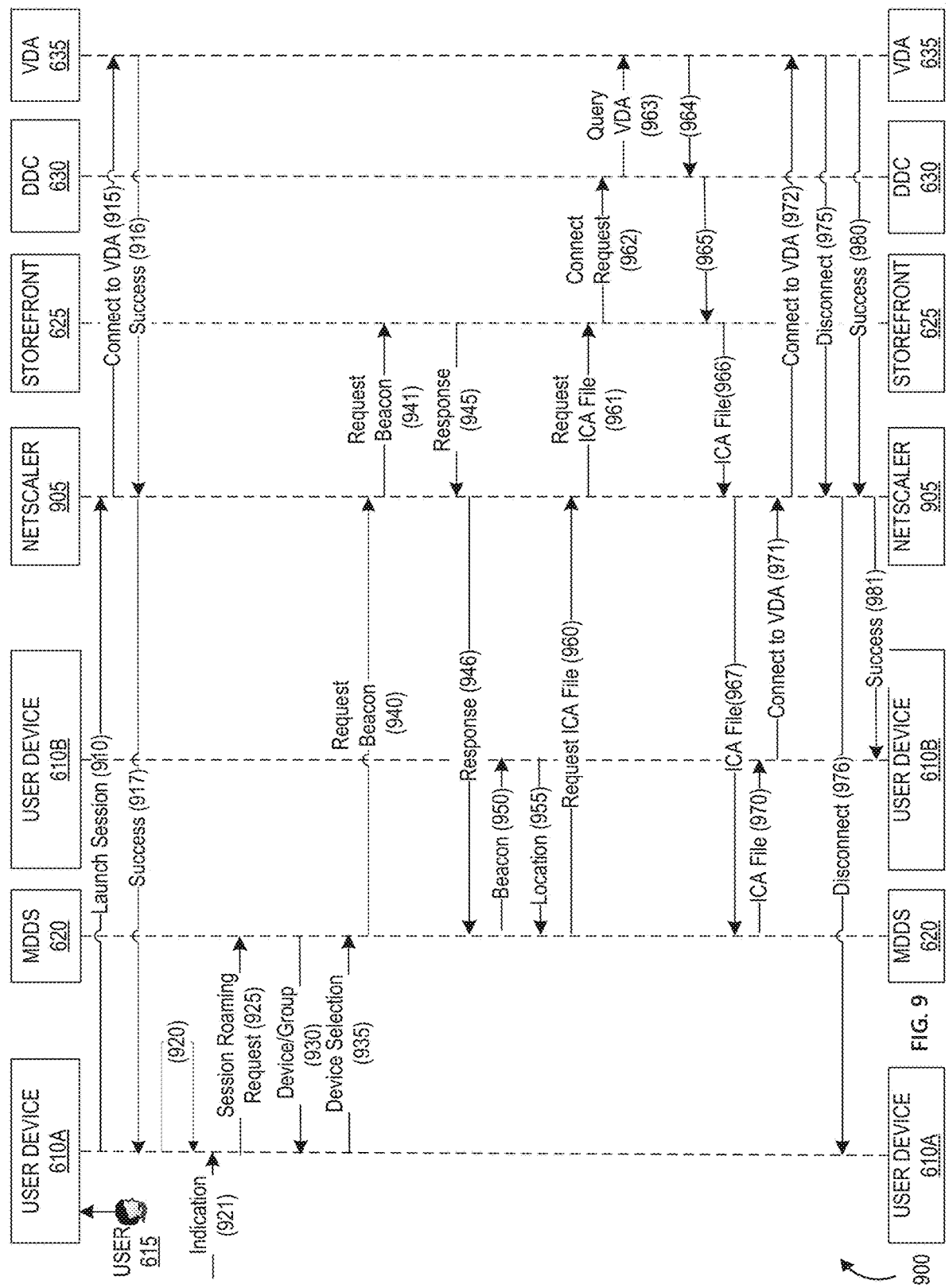
FIG. 9 illustrates another example process for session roaming based on proximity authentication performed by the example system of FIG. 6.

FIG. 9 illustrates another example process and algorithm 900 for providing automatic session roaming based on proximity authentication performed by the example system of FIG. 6. While FIG. 9 is described with reference to FIG. 6, it should be noted that the steps of FIG. 9 may be performed by other systems. In some implementations, the system 600 in FIG. 6 may include a NetScaler 905 (not shown in FIG. 6).

A user 615 launches a session of a mobile workspace on a first user device 610a. As shown in stages 910 and 915, the first user device 610a sends a request to launch a new session between the first user device 610a and the VDA 635. The request to launch the new session is forwarded to the VDA 635 via the NetScaler 905. At stages 916 and 917, the new session is successfully launched between the first user device 610a and the VDA 635. The user 615 may access and interact with various applications within the active session on the first user device 610a. The applications may be provided by the Store Front 625. The user devices 610 may each initiate a TCP connection to the MDDS 620 for user device registration upon connecting to the Internet. The MDDS 620 may maintain the TCP connection to each user device 610 in the form of a persistent TCP connection. At stage 920, an application, such as Citrix Receiver, residing on the first user device 610a records information about the Store Front 625 to which the new session is connected to.

As previously discussed, automatic session roaming may be initiated based on a user gesture or policy rule. At stage 925, based on receiving an indication 921 to initiate session roaming, the first user device 610a sends a Session Roaming Request to the MDDS 620. Upon receiving the Session Roaming Request, the MDDS 620 determines the device group(s) associated with the first user device 610a. As discussed with reference to FIG. 6, the first user device 610a may belong to a trusted user device group that also includes the second and third user devices 610b-c. The MDDS 620 also determines the distance between the first user device 610a and each of the second and third user devices 610b-c based on geographic location information about the first through third user devices 610a-c.

At stage 930, the MDDS 620 sends the relevant device group and device location information to the first user device 610a. The first user device 610a selects a target device based on a proximity of the second or third user device 610b-c to the first user device 610a. FIG. 6 shows a distance between the first user device 610a and the second user device 610b as a first distance 655a and a distance between the first user device 610 and the third user device 610c as a second distance 655b. The distances 655 between the first user device 610a and each of the second, and third user devices 610b-d may be determined based on the geographic location information of each of the first, second, third user devices 610a-d. In FIG. 6, the distances 655 indicate that the second user device 610b is physically located closest to the first user device 610a. Therefore, the second user device 610b may be selected as the target device.

At stage 935, the first user device 610a sends a message to the MDDS 620 identifying the second user device 610b as the selected target device, information about the Store Front 625 to which the session is connected to, and resource name of the session.

At stages 940 and 941, based on receiving the message from the first user device 610a, the MDDS 620 requests beacon information related to the second user device 610b from the Store Front 625 via the NetScaler 905. At stages 945 and 946, the Store Front 625 sends the requested beacon information via the NetScaler 905, to the MDDS 620. At stage 950, based on receiving the requested beacon information from the Store Front 625, the MDDS 620 may push the beacon information to the second user device 610b and request the second user device 610b to report beacon detection results including geographic location information and a network type identifying whether the second user device 610b on WAN or LAN.

As stage 955, based on receiving the request for geographic location information from the MDDS 620, the second user device 610b sends its geographic location information to the MDDS 620. At stage 960, the MDDS 620 sends an ICA file request for the second user device 610b to the Store Front 625 via the NetScaler 905 (shown at stage 961). An ICA (Independent Computing Architecture) file is used by Citrix application servers. It contains configuration information for connecting to different servers and may link to a published application or to a server desktop environment. ICA files allow users to connect to remote virtual desktops so the user's computer does not need the applications to be installed locally. This mechanism provides advantages for system administration and also allows users to access critical business applications, or "enterprise applications," from remote locations.

At stages 962, 963, 964, 965, the Store Front 625 may receive the data from the DDC 630 based on querying the VDA 963. Based on receiving the data from the DDC 630, the beacon detection results, and other relevant information, the Store Front 625 creates an ICA file. At stages 966 and 967, the Store Front 625 sends the ICA file via the NetScaler 905 to the MDDS 620. At stage 970, based on receiving the ICA file from the Store Front 625, the MDDS 620 sends the ICA file to the second user device 610b. The MDDS 620 may relay the ICA file to the second user device 610b by leveraging a persistent TCP connection that the MDDS 620 maintains with each of the user devices 610. At stages 971 and 972, based on processing the ICA file, the second user device 610b connects to the VDA 635 and at stages 980 and 981, a new session is launched as a user authenticated session between the VDA 635 and the second user device 610b. At stages 975 and 976, the session between the VDA 635 and the first user device 610a is closed or disconnected.

As discussed above, the user devices 610 may each initiate a TCP connection to the MDDS 620 for user device registration upon connecting to the Internet. The MDDS 620 may maintain the TCP connection to each user device 610 in the form of a persistent TCP connection. Thus, regardless of whether the user devices 610 are connected via WAN or LAN, an ICA file with a small data size may be easily transferred between the MDDS 620 and the user devices 610.

Figure 10:
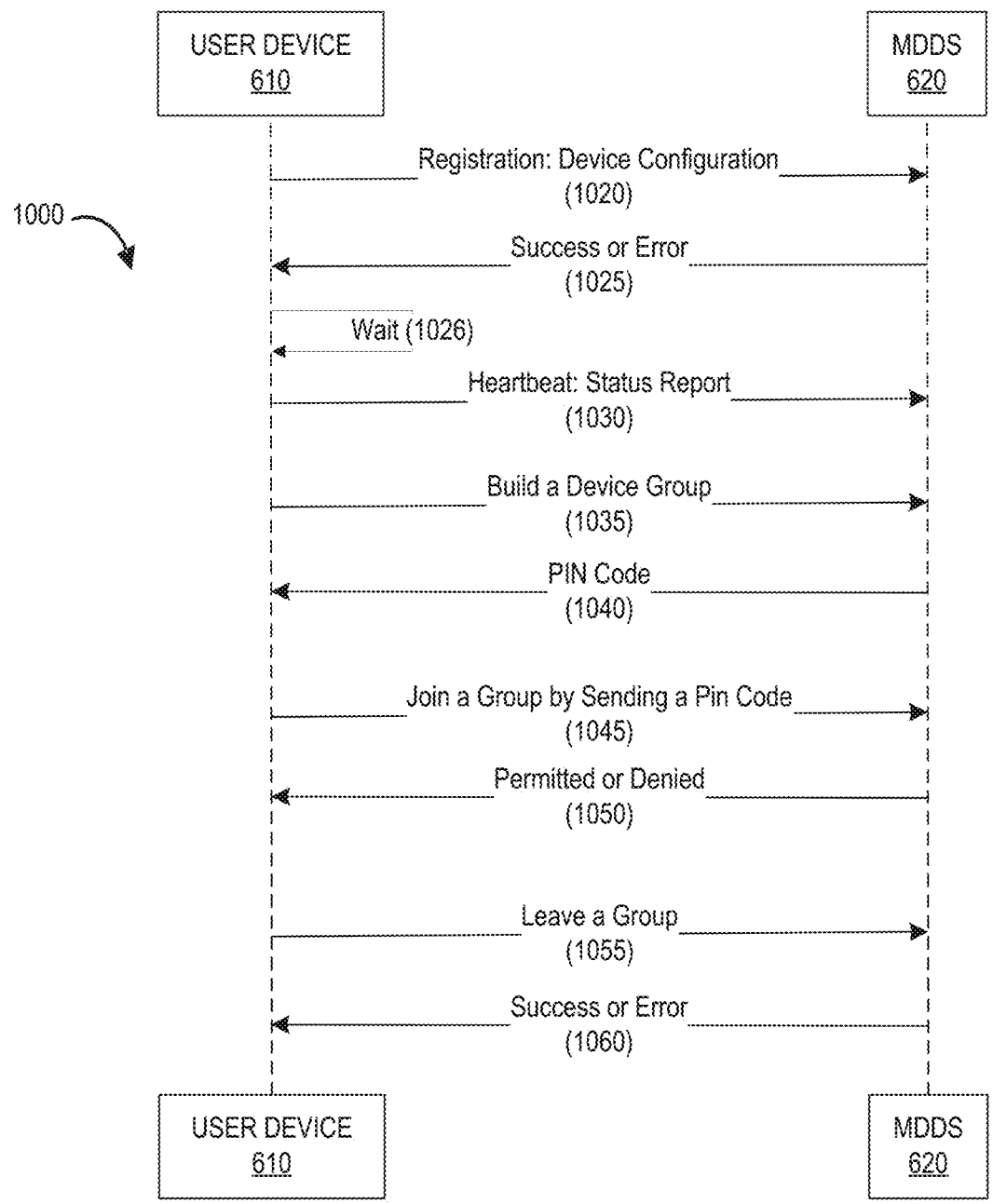
FIG. 10 depicts an example process and algorithm for mobile user device registration, status update, and device group setup and maintenance in accordance with one or more illustrative aspects described herein.

FIG. 10 depicts an example process and algorithm 1000 for user device registration, status update, and device group setup and maintenance in accordance with one or more illustrative aspects described herein. Referring back to FIG. 6, when the MPS 650 initializes or reboots, a device registration request is sent at stage 1020 from the user devices 610 to the MDDS 620 that includes geographic location information of the user devices 610, the network configuration, and other information. After receiving the device registration requests from the user devices 610, the MDDS 620 sends success or error notifications to the user devices 610 (stage 1025). A user device 610 waits (stage 1026) and then periodically (based on a heartbeat) reports to the MDDS 620 to keep the user device 610 status up-to-date (stage 1030). In some implementations, when a user device 610 fails to report to the MDDS 620 for a predetermined number of consecutive heartbeats, the MDDS 620 marks the status of the user device 610 as being offline. The status of the user device 610 is updated for all device groups that the user device 610 belongs to. If two user devices 610 belonging to the same device group are located within a predetermined distance to each other, the MDDS 620 may set the status of both user devices 610 as AVAILABLE for session roaming. Otherwise, the MDDS 620 may set the status of both user devices 610 as AWAY and a session may not be able to roam between the two user devices 610. When the status of both a source user device and a target user device belonging to the same specific device group is AVAILABLE, a session roaming between the two user devices 610 may be performed. Otherwise, the session roaming request may be rejected.

A device may create a device group with itself as the device group owner. At stage 1035, a user device 610 may request the MDDS 620 to create a device group designating the requesting user device 610 as the device group owner. In response to the request, at stage 1040, the MDDS 620 may return a random generated PIN code representing the device group identification to requesting user device 610. If other user devices 610 want to join the device group created by a user device 610, the PIN code representing the device group identification (stage 1040) is shared with them. Since any user device 610 may request creation of a device group, the MDDS 620 may delete a device group if no user device 610 joins that device group within a predetermined length of time after the device group is created in order to avoid too many device groups with only a single user.

A user device 610 may join an existing device group by sending the MDDS 620 a request that includes the device group PIN code or identification (stage 1045). Based on receiving a request from a user device 610 to join a device group, the MDDS 620 may identify the device group within a database using the device group PIN code or identification. The MDDS 620 may then determine the geographic distance between the user device 610 designated as the device group owner and the user device 610 requesting to join. The requesting user device 610 may be permitted or denied authorization (stage 1050) to join the device group based on providing a valid and unexpired invitation code. The invitation code may be valid for a predetermined length of time after the device group is created. The requesting user device 610 may be allowed to join the device group when the user device that is designated as the device group owner and the requesting user device are physically within a predetermined distance from each other, for example, less than 50 meters.

Providing an unexpired invitation code and being with a predetermined distance reduces the risk of hacking by unauthorized user devices and thereby, improves the security of device groups. In some implementations, the user device originating the invitation code is designated as a master device, while other user devices that are invited are designated as slave devices relative to the master device. The MDDS 620 checks whether designated slave devices are within range of the master device and also whether the slave devices submit a valid and unexpired PIN code. Then, the MDDS 620 responds to the slave device indicating whether permission to join the device group is granted or denied.

A user device 610 may leave a device group that it created or any device groups that it joined by sending a request to leave a device group to the MDDS 620 (stage 1055). In response, the MDDS 620 may remove the device ID of the requesting user device 610 from the device group and at stage 1060, the MDDS 620 may send an indication of success or error to the requesting user device 610. The MDDS 620 may delete or remove a device group whenever the device group owner leaves the device group, or the device group owner is the only member of the device group for longer than a predetermined length of time (maximum lifetime of a device group owner).

In order to reduce computational cost, the MDDS 620 syncs the device group information with a user device 610 in response to specific events. The MDDS 620 syncs device group information with a user device 610 when a user device 610 manually refreshes, when a user device 610 sends a registration request to the MDDS 620, when a user device 610 creates a device group, or when a user device 610 requests session roaming. The MDDS 620 may calculate the distance between any two user devices 610 from any device group to ensure that accurate device status is maintained for session roaming. The MDDS 620 may periodically perform n*(n−1)/2 distance calculations based on geographic data for a device group with n user devices. Performing these distance calculations for multiple device groups may be computationally costly. Therefore, by performing distance calculations in response to specific events, the MDDS 620 may maintain accurate user device status while reducing computational cost.

Although the subject matter has been described in language specific to structural features and/or methodological acts, it is to be understood that the subject matter defined in the appended claims is not necessarily limited to the specific features or acts described above. Rather, the specific features and acts described above are described as example implementations of the following claims.

What is claimed is:

1. A method comprising:
   based on receiving, by a computing device, an indication to initiate roaming of a session of a mobile workspace of a user that is launched on a first user device, selecting a second user device from among one or more trusted user devices based on a proximity of the second user device to the first user device, wherein
      the indication to initiate session roaming is determined based on a policy rule that identifies the first user device as a master device and designates the one or more trusted user devices as a slave device of the first user device, and based on a determination that a distance between the first user device and at least one slave device is less than a predetermined threshold; and
   launching the session as a user authenticated session on the second user device.

2. The method of claim 1, wherein the policy rule specifies a battery usage threshold, and the indication to initiate roaming of the session is further determined based on a determination that a battery usage of the first user device is below the specified battery usage threshold.

3. The method of claim 1, wherein the first user device and the second user device are each connected to a different one of a wide area network, and a local area network.

4. The method of claim 1, wherein the roaming of the session comprises disconnecting the session launched on the first user device.

5. The method of claim 1, wherein the first user device and the one or more trusted user devices belong to a logical grouping of user devices.

6. The method of claim 1, further comprising:
   determining, based on receiving one or more valid codes from the one or more trusted user devices, the one or more trusted user devices.

7. The method of claim 1, further comprising:
   determining, based on receiving one or more codes corresponding to an invitation code from the one or more trusted user devices, the one or more trusted user devices, wherein the invitation code is generated by the master device.

8. A system comprising:
   one or more processors; and
   a memory storing computer-readable instructions that, when executed by the one or more processors, configure the one or more processors to:
      based on receiving, an indication to initiate roaming of a session of a mobile workspace of a user that is launched on a first user device, select a second user device from among one or more trusted user devices based on a proximity of the second user device to the first user device, wherein
         the indication to initiate session roaming is determined based on a policy rule that identifies the first user device as a master device and designates the one or more trusted user devices as a slave device of the first user device and based on a determination that a distance between the first user device and at least one slave device is less than a predetermined threshold; and
      roam the session from the first device to the selected second user device by launching the session as a user authenticated session of the mobile workspace of the user on the second user device.

9. The system of claim 8, wherein the policy rule specifies a battery usage threshold, and the indication to initiate session roaming is further determined based on a determination that a battery usage of the first user device is below the specified battery usage threshold.

10. The system of claim 8, wherein the first user device and the second user device each are connected to a different one of a wide area network, and a local area network.

11. The system of claim 8, wherein the roaming of the session comprises disconnecting the session launched on the first user device.

12. The system of claim 8, wherein the first user device and the one or more trusted user devices belong to a logical grouping of user devices.

13. The system of claim 8, where the instructions that, when executed by the one or more processors, further configure the one or more processors to:

determine, based on receiving one or more valid codes from the one or more trusted user devices, the one or more trusted user devices.

14. The system of claim 8, wherein the first user device and the second user device may be of different device types.

15. The system of claim 8, wherein the instructions that, when executed by the one or more processors, further configure the one or more processors to:

determine, based on receiving one or more codes corresponding to an invitation code from the one or more trusted user devices, the one or more trusted user devices, wherein the invitation code is generated by the master device.

16. A non-transitory machine readable storage medium comprising machine-readable instructions for causing a processor to execute a method comprising:

based on receiving an indication to initiate roaming of a session of a mobile workspace of a user that is launched on a first user device, selecting a second user device from among one or more trusted user devices based on a proximity of the second user device to the first user device, wherein the indication to initiate session roaming is determined based on a policy rule that identifies the second user device as a master device, and based on a determination that the first user device is designated as a slave device of the master device, and a distance between the first user device and the master device is greater than a predetermined threshold; and roaming the session from the first device to the selected second user device by launching the session as a user authenticated session of the mobile workspace of the user on the second user device.

17. The non-transitory machine readable storage medium of claim 16, wherein the first user device and the second user device are each connected to a different one of a wide area network, and a local area network.

18. The non-transitory machine readable storage medium of claim 16, wherein the roaming of the session comprises disconnecting the session launched on the first user device.

19. The non-transitory machine readable storage medium of claim 16, wherein the first user device and the second user device may be of different device types.

20. A method comprising:

based on receiving, by a computing device, an indication to initiate roaming of a session of a mobile workspace of a user that is launched on a first user device, selecting a second user device from among one or more trusted user devices based on a proximity of the second user device to the first user device, wherein the indication to initiate session roaming is determined based on a policy rule that identifies the second user device as a master device, and based on a determination that the first user device is designated as a slave device of the master device, and a distance between the first user device and the master device is greater than a predetermined threshold; and roaming the session from the first device to the selected second user device by launching the session as a user authenticated session of the mobile workspace of the user on the second user device.

\* \* \* \* \*